United States Patent
Seifried et al.

(10) Patent No.: US 7,669,874 B2
(45) Date of Patent: Mar. 2, 2010

(54) SYSTEM FOR THE TRANSPORTATION OF CONSTRUCTION MACHINES, PREFERABLY EXCAVATORS

(75) Inventors: Werner Seifried, Ulm/Donau (DE); Harald Westner, Memmingen (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 10/828,820

(22) Filed: Apr. 21, 2004

(65) Prior Publication Data
US 2004/0265105 A1    Dec. 30, 2004

(30) Foreign Application Priority Data
Apr. 22, 2003    (DE) .............. 203 06 290 U

(51) Int. Cl.
*B60P 3/08* (2006.01)
*B60P 3/28* (2006.01)

(52) U.S. Cl. .................... 280/404; 280/476.1
(58) Field of Classification Search ............ 280/404, 280/476.1
See application file for complete search history.

(56) References Cited

U.S. PATENT DOCUMENTS

| | | | | |
|---|---|---|---|---|
| 3,631,999 A | * | 1/1972 | Walerowski | 414/458 |
| 4,168,931 A | * | 9/1979 | Harris | 414/458 |
| 4,199,298 A | * | 4/1980 | Webre et al. | 414/458 |
| 4,262,923 A | * | 4/1981 | Weir | 280/415.1 |
| 5,112,073 A | * | 5/1992 | McGhie et al. | 280/404 |
| 5,362,083 A | * | 11/1994 | Emanuele et al. | 280/404 |
| 5,370,414 A | * | 12/1994 | Tucker | 280/404 |
| 6,450,743 B1 | | 9/2002 | Bryan, II | |
| 6,663,131 B2 | * | 12/2003 | Evans | 280/476.1 |
| 2001/0020656 A1 | | 9/2001 | Frick | |

FOREIGN PATENT DOCUMENTS

| | | |
|---|---|---|
| EP | 0032474 | 7/1981 |
| EP | 0990557 | 4/2000 |
| GB | 2319233 | 5/1998 |

* cited by examiner

*Primary Examiner*—Tony H. Winner
(74) *Attorney, Agent, or Firm*—Dilworth & Barrese, LLP.

(57) ABSTRACT

The invention relates to a system for the transportation of construction machines, preferably excavators, with a front subassembly, which can be used to couple a tractor vehicle, and a rear subassembly. According to the invention, the construction machine itself can be joined into a single transportation unit with the front subassembly and the rear subassembly.

19 Claims, 2 Drawing Sheets b)

c)

d)

e)

f)

SYSTEM FOR THE TRANSPORTATION OF CONSTRUCTION MACHINES, PREFERABLY EXCAVATORS

BACKGROUND OF THE INVENTION

This invention relates to a system for the transportation of construction machines, preferably excavators.

To transport a construction machine, such as an excavator, from construction site 1 to construction site 2, there are basically two possibilities. For small distances, a mobile excavator can drive on the street if it is has the necessary traffic permit. For longer distances, or if the construction machine lacks a traffic permit, as is the case with crawler excavators, the machine is transported by a low loader. Such low loaders are used in many other applications as well. A low loader has a platform supporting the weight of the device. The disadvantage is that an additional low loader needs to be procured for transport of construction machines. In addition, there are frequently problems with the overall height, since the height of the low loader must be added to that of construction machine. In particular, the transportation of excavators often results in exceeding the maximum permissible overall height. Moreover, the use of known low loaders often results in weight problems, since the maximum permissible total weight is often exceeded.

SUMMARY OF THE INVENTION

The purpose of this invention is to provide a system for the transportation of construction machines, preferably excavators, so that the excavator can be transported in such a way that the overall height and total weight are easier to deal with. In addition, the system should be as cost-efficient and simple as possible, since the complete system can be used for variable modes of transportation.

According to this invention, the purpose is achieved through a combination of the characteristics of a system for the transportation of construction machines, preferably excavators, with a front subassembly used for coupling to a tractor vehicle and a rear subassembly, where the construction machine itself is joined together into a single transportation unit with the front subassembly and the rear subassembly. Accordingly, a system is created for the transportation of construction machines, preferably excavators, with a front subassembly, which can be coupled to a tractor vehicle, and a rear subassembly, whereby the construction machine itself can be coupled to the front and rear subassemblies to form a single transportation unit. This clearly dispenses with the need for the usual loading platform on a deep loader. The framework of the construction machine itself replaces the loading platform. By means of coupling devices suitably arranged on the front and rear subassemblies, the entire system can be joined together into a single transportation unit.

Advantageous embodiments of the invention are also expressed herein.

The front subassembly and/or rear subassembly may include truck-type undercarriages with one or more axles. The choice of the number of axles depends on the total weight of the construction machine to be coupled.

According to an especially advantageous embodiment of the invention, the assembly can take the form of a semitrailer, with a front subassembly featuring an ordinary trailer coupler for a semitrailer in this variation.

Another especially advantageous embodiment of the invention comprises self-contained front and rear subassemblies that may be raised and lowered, whereby the construction machine may be coupled or locked by raising the subassemblies.

Finally, the front and rear subassemblies may include pneumatic cushioning to raise and lower them. Instead of pneumatic cushioning, hydraulic cushioning may also be used.

A modular system of the transportation system is also expressed herein. In this case, instead of the construction machine, an intermediate part that forms a loading platform can be connected. The intermediate part may be, for example, a high-bed for a platform low loader or a low-bed for that type of platform low loader. This results in a modular system with a variable mode of using the transportation system. Thus, the front and rear subassembly may be coupled directly to the construction machine in order to transport it. Alternatively, the front subassembly and rear subassembly may also be combined with the usual high-bed or low-bed of a platform loader, in order to perform other transportation functions. Depending on the type of transportation, front or rear subassemblies with one or more of axles may be selected.

BRIEF DESCRIPTION OF THE DRAWINGS

Other details and advantages of the invention are illustrated more precisely in a drawing of the sample embodiments. They show.

DESCRIPTION OF PREFERRED EMBODIMENTS

Figure 1:
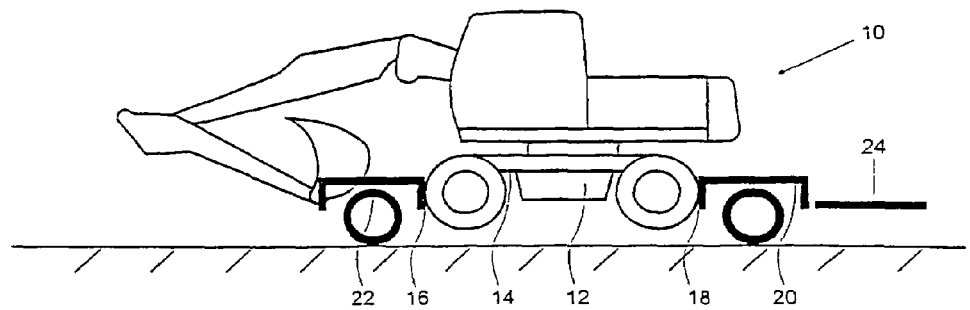
FIG. 1: a schematic side view of a transportation system according to the invention with a coupled excavator
Figure 2:
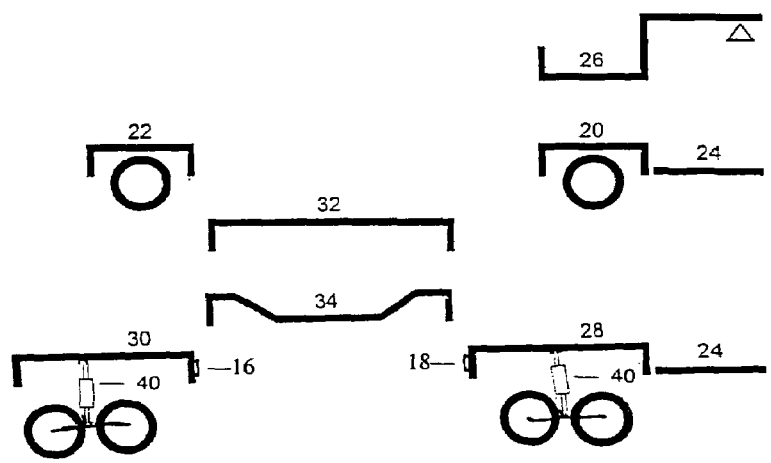
FIG. 2: a schematic representation of a modular transportation system, represented in single parts

FIG. 1 shows a transportation system 10 according to the invention in its assembled state. It comprises a mobile excavator 12 of standard design, connected in the front and rear part of its undercarriage 14 by locking units 16 and 18, which are not represented here in detail. Especially for long-distance transportation, the excavator 12 may be joined into a single transportation unit with the forward subassembly 20 and rear subassembly 22, wherein the locking function is provided by locking units 16 and 18. In the sample embodiment illustrated here, the front subassembly 20 is built as a single-axle truck-type undercarriage, connectable in the usual manner by a semi-trailer coupler to a tractor vehicle. The truck-type undercarriage of the front subassembly 20 is built in a steerable manner not depicted in detail here but well-known in the current state of the art. The rear subassembly 22 is also formed of a single-axle truck-type undercarriage, Instead of the single-axle truck-type undercarriages 20 and 22, as shown in FIG. 2, multi-axle truck-type undercarriages may also be used, such as the two-axle truck-type undercarriages 28 and 30. A semi-trailer module 26 can also be integrated if desired (see FIG. 2).

The front subassembly 20 and the rear subassembly 22 are built in a self-contained manner, and preferably capable of being raised and lowered, whereby by raising the subassembly it is possible to couple and/or lock the construction machine. Such raising and lowering could be performed, for example, by means of a mechanical system employing, for example, air cushioning or hydraulic cushioning 40, as shown in FIG. 2.

Figure 3:
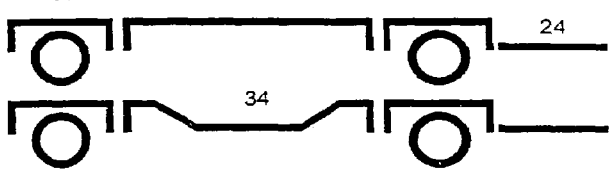
FIG. 3: a-f: Various combinations of the transportation system modules represented in FIG. 2
Figure 3:
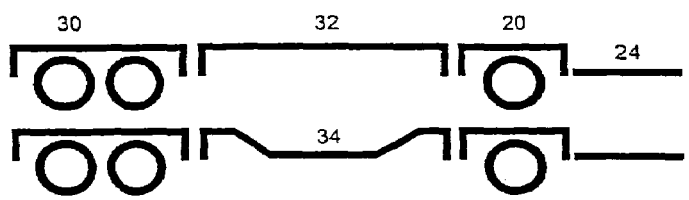
Figure 3:
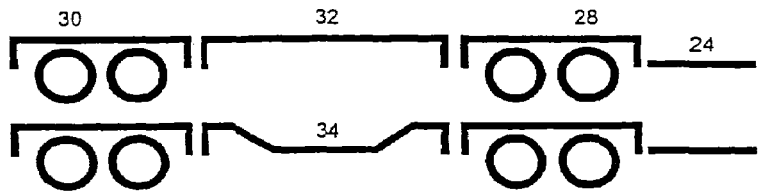

An especially advantageous modular transportation system may be formed by using various inserts, as desired, instead of a construction machine such as the excavator 12 in the present case, in combination with front subassembly 20 or 26 or 28 and rear subassembly 22 or 30. In this manner, in place of the construction machine, it is possible to insert an intermediate part comprising a loading platform in the form of a high-bed 32 or low-bed 34. These possible combinations result in the constructions shown schematically in FIG. 3, illustrating a combination of a single-axle front subassembly 20 with a high-bed 32 and a single-axle rear subassembly 22 (FIG. 3a).

FIG. 3b): a single-axle front subassembly 20, a low-bed 34, in combination with a single-axle rear subassembly 22.

FIG. 3c): a single-axle front subassembly 20, a high-bed 32, in combination with a two-axle rear subassembly 30.

FIG. 3d): a single-axle front subassembly 20, a low-bed 34, in combination with a two-axle rear subassembly 30.

FIG. 3e): a two-axle front subassembly 28, in combination with a high-bed 32 and a two-axle rear subassembly 30.

Finally, FIG. 3f) shows the combination of a two-axle front subassembly 28 connected to a low-bed 34 and a two-axle rear subassembly 30.

This shows by a way of example a few possible combinations of the modular system.

Instead of the mobile excavator shown here coupled with the front subassembly and the rear subassembly, it is also possible, of course, to use the locking units to couple crawler excavators, wheel loaders, tiltdozers, loading tractors, road rollers, or other construction machines with their respective fittings for variable modes of transport.

Figure 4A:
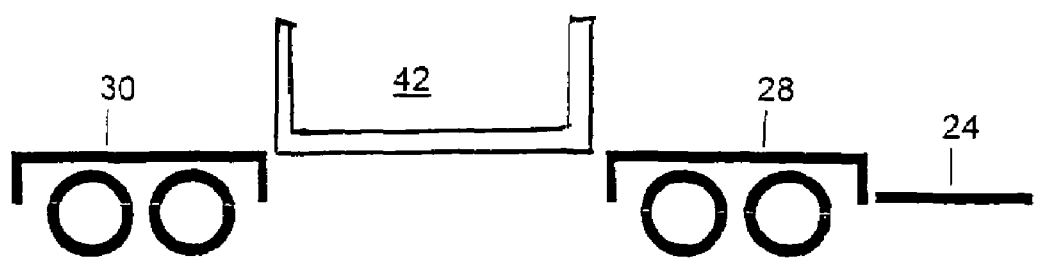
FIGS. 4a and 4b illustrate, respectively, schematic representations of the modular transport system including a construction equipment container and a cable drum system.
Figure 4B:
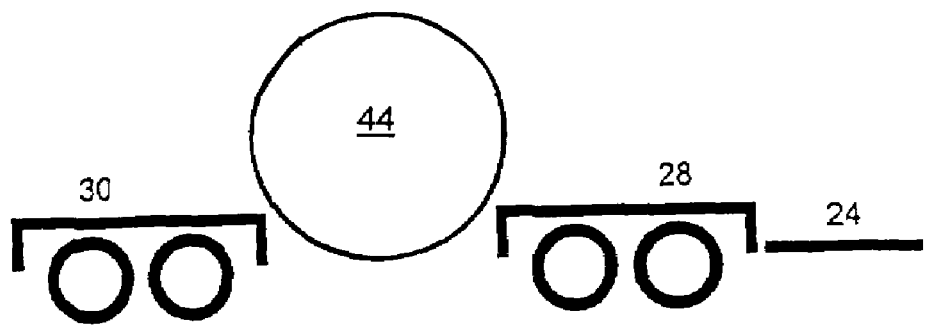

Referring now to FIGS. 4a and 4b, the modular transport system can include, coupled to the front subassembly 28 and the rear subassembly 30, a construction container or construction equipment carrier 42, or a cable drum system 44.

The construction machine, for example the excavator shown in FIG. 1, could be coupled with the other parts of the transportation system in the following manner, by way of example.

The excavator is driven up against the rear subassembly 22. By means of air cushioning or hydraulic cushioning, the rear subassembly 22 is raised up into it and locked.

Then the front module is pushed in, and the module is raised up into it and locked. Finally, both subassemblies are brought into driving position, so that the excavator 12 attains the transportation position shown in FIG. 1, in which its front wheels are raised off the ground.

According to one possible embodiment of the invention, the subassemblies are solidly connected, but the subassemblies 20, 26, 28 or 22 and 30 may be equipped with a steering mechanism as desired, which may be a hydraulically, mechanically, or adhesion-guided steering system.

Reference numeral 24 denotes coupling to a tractor vehicle in all the figures.

The invention claimed is:

1. A system for the transportation of construction machines comprising:
   a front subassembly for coupling to a tractor vehicle and a rear subassembly, wherein
   the front subassembly has a first locking unit positioned on a rear end of the front assembly for directly joining to a first lateral end of a construction machine having at least one traction element and the rear subassembly has a second locking unit positioned at a front end of the rear assembly for directly joining to a second lateral end of the construction machine,
   in a coupling position, the at least one traction element of the construction machine being disposed on a ground surface and the construction machine is laterally joined together with the front subassembly and the rear subassembly to form a single transportation unit with the front and rear subassemblies supporting the construction machine on the ground for movement during transport in the lateral direction and without supporting structure underneath the construction machine and in a transportation position, the at least one traction element of the construction machine being raised off the ground, and
   the front and rear subassemblies each include a truck undercarriage with one or more axles; and
   said system further including at least one intermediate loading platform which is connectable to the rear end of the front assembly and the front end of the rear assembly for being positioned therebetween.

2. A system of claim 1 wherein the front subassembly includes a semitrailer coupler of a trailer.

3. A system of claim 1 wherein said first and second locking units are each structured and arranged to laterally receive the construction machine including a loading platform.

4. A system of claim 1, wherein the front and rear subassemblies are self-contained units raisable and lowerable to couple and/or lock the construction machine.

5. A system of claim 4, wherein the front and rear subassemblies include an air cushion or a hydraulic cushion, for raising and lowering.

6. A system of claim 1, wherein the construction machine is an excavator.

7. A system of claim 1, wherein the at least one traction element is a crawler track.

8. A system of claim 1, wherein the at least one traction element is a wheel.

9. A system of claim 1, wherein the construction machine includes a plurality of traction elements.

10. A system of claim 1, wherein at least one of the front subassembly and the rear subassembly include a steering mechanism.

11. A system of claim 1, wherein the front subassembly and the rear subassembly each include a steering mechanism.

12. The system of claim 1 including a high bed loading platform and a low bed loading platform.

13. A system for the transportation of construction machines comprising:
   a front subassembly for coupling to a tractor vehicle and a rear subassembly, wherein
   the front subassembly has a first locking unit positioned on a rear end of the front assembly for directly joining to a first lateral end of a construction machine having at least one traction element, and the rear subassembly has a second locking unit positioned at a front end of the rear assembly for directly joining to a second lateral end of the construction machine,
   in a coupling position, the at least one traction element of the construction machine being disposed on a ground surface and the construction machine being disposed on a ground surface and the construction machine is laterally joined together with the front subassembly and the rear subassembly to form a single transportation unit and in a transportation position, the at least one traction element of the construction machine being raised off the ground, and the front and rear subassemblies are self-contained units raisable and lowerable to couple and/or lock the construction; and said system further including at least one intermediate loading platform which is connectable to the rear end of the front assembly and the front end of the rear assembly for being positioned therebetween.

14. A system of claim 13 wherein the front and rear subassemblies include an air cushion or a hydraulic cushion, for raising and lowering.

15. A system of claim 13, wherein the front and rear subassemblies each include a truck undercarriage with one or more axles.

16. A system of claim 15, wherein the first front subassembly includes a semitrailer coupler of a trailer.

17. The system of claim 13 including a high bed loading platform and a low bed loading platform.

18. A method for transportation of construction machines, the method comprising the steps of:

providing a front subassembly for coupling to a tractor vehicle and a rear subassembly, the front subassembly having a first locking unit and the rear subassembly having a second locking unit said front and rear subassemblies having means for connection to an intermediate loading platform positioned therebetween;

in a coupling position, providing a construction machine having a first portion, a second portion and at least one traction element;

disposing the first portion and the second portion of the construction machine in a coupling position such that the at least one traction element is disposed on a ground surface and the first portion is adjacent the front subassembly and the second portion is adjacent the rear subassembly;

raising the rear subassembly into engagement with the second portion and the front subassembly with the first portion into a transportation position such that the second locking unit is fixed with the second portion and the first locking unit is fixed with the first portion, and the at least one traction element is raised off the ground; and transporting the construction machine in the transportation position, and providing the intermediate loading platform, connecting the intermediate loading platform to the front and rear subassemblies and transporting the intermediate loading platform.

19. A method of claim 18, wherein the the front and rear assemblies are connected to the intermediate loading platform and not the construction machine.

* * * * *